(12) United States Patent
Macklai et al.

(10) Patent No.: US 11,711,461 B1
(45) Date of Patent: Jul. 25, 2023

(54) SYSTEM AND METHOD FOR FLAGGING AND DECOMMISSIONING COMPROMISED TELEPHONE NUMBERS PRIOR TO USE FOR OUTBOUND CALLING

(71) Applicant: Ahmed Macklai, Plantation, FL (US)

(72) Inventors: Ahmed Macklai, Plantation, FL (US); Stanislav Doronin, St. Petersburg (RU); Bryan Burchfield, St. Augustine, FL (US); Brandon Bisnette, Orlando, FL (US)

(73) Assignee: Ahmed Macklai

( * ) Notice: Subject to any disclaimer, the term of this patent is extended or adjusted under 35 U.S.C. 154(b) by 101 days.

(21) Appl. No.: 17/489,503

(22) Filed: Sep. 29, 2021

(51) Int. Cl.
   *H04M 3/24* (2006.01)

(52) U.S. Cl.
   CPC .................... *H04M 3/24* (2013.01)

(58) Field of Classification Search
   None
   See application file for complete search history.

(56) References Cited

U.S. PATENT DOCUMENTS

| | | | |
|---|---|---|---|
| 7,106,844 B1 * | 9/2006 | Holland | H04Q 3/005 455/518 |
| 8,355,485 B2 * | 1/2013 | Schultz | H04M 15/00 379/112.06 |
| 9,338,289 B1 * | 5/2016 | Goyal | H04M 3/42042 |
| 2004/0096048 A1 * | 5/2004 | Sacra | H04Q 3/0029 379/221.13 |
| 2004/0193645 A1 * | 9/2004 | Cuckson | H04Q 3/005 |
| 2008/0046477 A1 * | 2/2008 | Schultz | H04M 15/00 |
| 2011/0038471 A1 * | 2/2011 | Gopalakrishna | H04Q 3/66 379/201.01 |

* cited by examiner

*Primary Examiner* — Quoc D Tran
(74) *Attorney, Agent, or Firm* — The Keys Law Firm PLLC

(57) ABSTRACT

A system and method for flagging and decommissioning compromised telephone numbers prior to use for outbound calling which employ a dialing system having access to a set of direct inward dial numbers which define or correspond to telephone number identifiers, a plurality of discrete call receiving devices which operate on different telephone networks, and a server which confirms whether calls placed by the dialing system were flagged as undesirable by the call receiving devices and can modify the set of direct inward dial numbers based on such a confirmation. Through this configuration, the server is able to identify in real time whether the telephone numbers defined by or corresponding to each of the direct inward dial numbers in the set of direct inward dial numbers is compromised or is otherwise undesirable for outbound calling and then flag and decommission such a compromised telephone number.

20 Claims, 3 Drawing Sheets

SYSTEM AND METHOD FOR FLAGGING AND DECOMMISSIONING COMPROMISED TELEPHONE NUMBERS PRIOR TO USE FOR OUTBOUND CALLING

BACKGROUND OF THE INVENTION

Field of the Invention

This invention relates to telecommunications systems and, more specifically, to the real time identification of undesirable direct inward dial numbers and automatic decommissioning of such identified direct inward dial numbers.

Description of the Prior Art

The use and design of various business telephone systems, such as private branch exchange ("PBX") systems, for the comprehensive implementation and management of the telephone systems of an organization is well established. While PBX systems typically offer a wide variety of services, at their core they often serve to operate an organization's telephone network by managing internal communications between telephones on the organization's internal telephone network as well as both inbound calls to and outbound calls from telephones on the telephone network. As such, it is common for a PBX system to maintain internal identifiers for each telephone on its internal telephone network, often referred to a direct inward dial ("DID") numbers, and also to correspond these DID numbers to full telephone numbers for whenever a telephone on the internal telephone network seeks engage in inbound or outbound calling to devices outside of the internal telephone network.

For organizations which operate as an outbound call center, whether for telemarketing, market research, or other commercial or non-commercial purposes, having a PBX system which utilizes a plurality of telephone numbers to identify outbound calls from telephone numbers on its network is often an essential part of their operation. For this reason, it is known that outbound call centers may often acquire large numbers of telephone numbers to use in bulk, with plans to use them selectively in accordance with various considerations, including considerations such as the particulars of a given telephone number (such as its country code or area code prefix). A problem which exists, however, is that when acquiring telephone numbers in bulk, it is difficult for the acquiring party to know if some of the numbers it has acquired are undesirable for use in outbound calling. For example, some telephone numbers may be designated by one or more telephone service providers as being SPAM or FRAUD RISK and therefore automatically blocked from connecting to telephone numbers on that network. In such a case, an outbound call center would have no use for such a telephone number.

In addition, outbound call centers generally and telemarketing has changed significantly the face of modern communication, particularly the explosion in popularity of mobile phones. Today, millions of people every day use their mobile phones to communicate instantaneously across the world and over international and cultural boundaries. And with mobile phones, there is often a higher level of decentralization of the telephone network used for telephone servers, so in any given area, it is difficult to know what network calls made to telephones therein will be connected through.

To illustrate the scale of this, it is known that the smartphone market in the United States is one of the world's largest, with more than 260 million smartphone users. In line with the overall growth of the smartphone market worldwide, the smartphone penetration rate in the United States has continuously risen over the past ten to fifteen years to more than 80 percent today. And as mobile phone technology has emerged and grown, so has the issue of unsolicited phone calls being made to mobile phones. Unsolicited phone calls, which are sometimes referred to as spam, may be made from a individual or machine who connects to a recipient's telephone number and attempts to sell items or services, solicit donations, or ask questions. But the defining characteristic for such a call is that the recipient who may not have asked to receive such a phone call. In this way, such calls are reminiscent of other types of excessive mass solicitations, which may come via postal services, facsimile transmissions, and emails. As such, a phone call recipient may receive hundreds of unsolicited phone calls over a short period of time.

To address this, telephone network providers, including mobile phony telephone service providers, often attempt to keep track of telephone numbers which are known to be used for spam calls by tagging them in their system. This way, telephone numbers which have been tagged can be blocked from connected to telephones numbers which operate on that network. Unfortunately, if a telephone number which has been tagged by a telephone service provider is sold to a new user, the tag may remain and the new user may be prevented from using their new number. And while a new user who acquires just one telephone number may notice very quickly if their newly acquired number was unable to call other phones, an organization which buys telephone numbers in bulk (and uses a lot of them at a given moment) may not realize that they have been sold numbers which are undesirable for outgoing calls.

Thus, there remains a need for a system and method which allows for telephone numbers which are compromised or otherwise unsuitable for use to be flagged and ultimately replaced or decommissioned.

SUMMARY OF THE INVENTION

The present disclosure describes a system and method for flagging and decommissioning compromised telephone numbers prior to use for outbound calling. The method for flagging and decommissioning compromised telephone numbers prior to use for outbound calling includes the steps of: retrieving by a dialing system a target identifier for use in connection with an outbound call, wherein the dialing system is adapted to automatically initiate telephone calls which connect to external devices and the target identifier is defined by a discrete caller identification identifier; initiating a telephone call by the dialer system to each of a plurality of discrete call receiving devices, wherein dialer system additionally causes the target identifier to be transmitted to each of the plurality of discrete call receiving devices as a part of the telephone call being initiated; wherein a first discrete call receiving device among the plurality of discrete call receiving devices is configured to receive calls wirelessly over a first mobile phone network which employs cellular technology and a second discrete call receiving device among the plurality of discrete call receiving devices is configured to receive calls wirelessly over a second mobile phone network which employs cellular technology; if any of the plurality of discrete call receiving devices acting to at least one of automatically block the telephone call initiated by the dialer system due to the target identifier that was transmitted and automatically associate the telephone call initiated by the dialer system with an undesirable incoming call message due to the target identifier that was transmitted, flagging the target identifier as compromised; and decommissioning the flagged target identifier so as to prevent the target identifier from being retrieved again by the dialer system.

The system for flagging and decommissioning compromised telephone numbers prior to use for outbound calling comprises a dialing system having access to a set of caller identification identifiers, a plurality of discrete call receiving devices which operate on different telephone networks, and a server computer system which confirms whether calls placed by the dialing system using a caller identification identifier amongst the set of caller identification identifiers was tagged as undesirable by the call receiving devices and can modify the set of caller identification identifiers based on such a confirmation.

It is an object of this invention to provide a system and method which allows telephone numbers which are compromised or otherwise unsuitable for use to be flagged and ultimately replaced or decommissioned.

This and other objects will be apparent to one of skill in the art.

DETAILED DESCRIPTION OF THE INVENTION

Described herein is a system and method which employ a dialing system having access to a set of direct inward dial numbers which define or correspond to telephone number identifiers, a plurality of discrete call receiving devices which operate on different telephone networks, and a server which confirms whether calls placed by the dialing system were tagged as undesirable by the call receiving devices and can modify the set of direct inward dial numbers based on such a confirmation. Through this configuration, the server is able to identify in real time whether the telephone numbers defined by or corresponding to each of the direct inward dial numbers in the set of direct inward dial numbers is compromised or is otherwise undesirable for outbound calling and then flag and decommission such a compromised telephone number.

Figure 1:
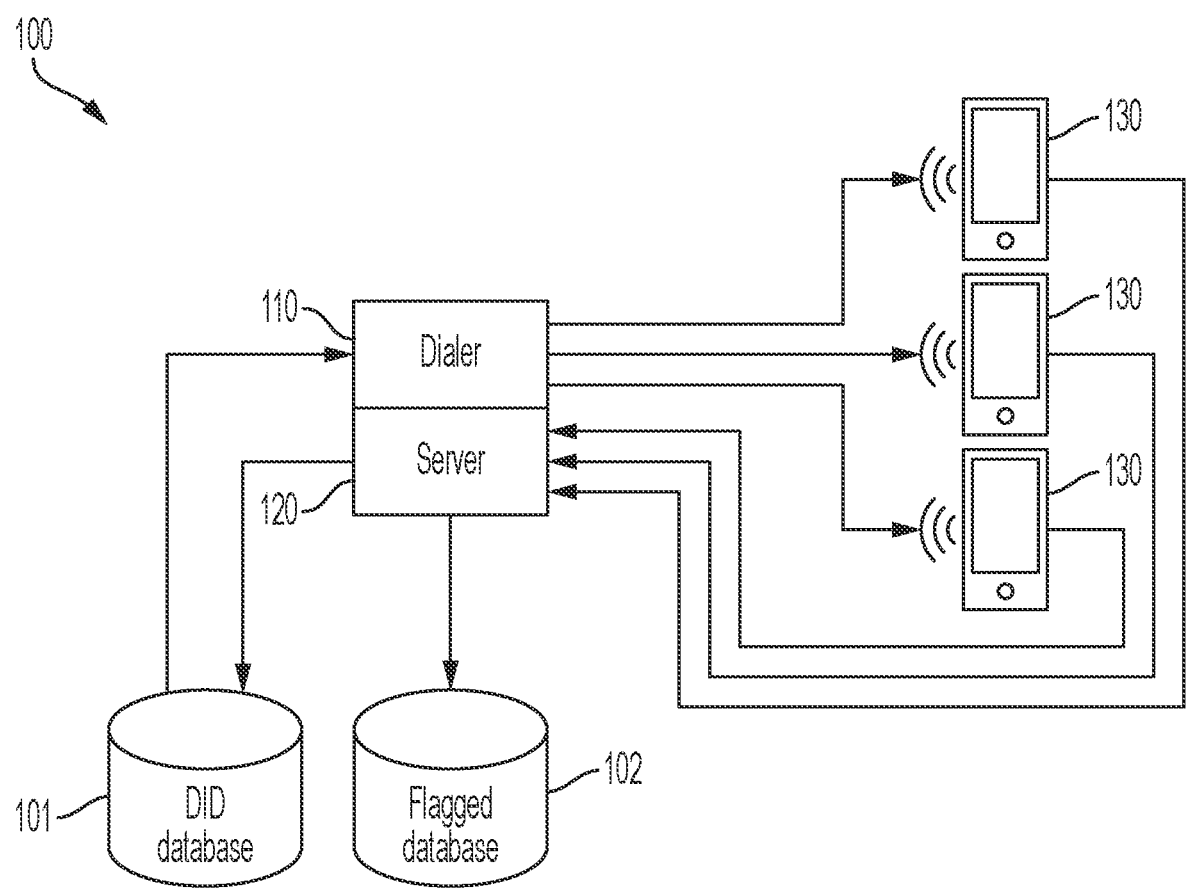
FIG. 1 is a block diagram of the data flow between the components of a system for flagging and decommissioning compromised telephone numbers prior to use for outbound calling in accordance with the present invention.

Referring now to the drawings and in particular FIG. 1, a system 100 for flagging and decommissioning compromised telephone numbers prior to use for outbound calling includes a dialing system 110, a server computer system 120, a plurality of call receiving devices 130. The system 100 may also include a direct inward dial database 101 and a flagged number database 102.

The dialing system 110 may be embodied as automatic dialer software which may operate on a computer system and is operative to place telephone calls using a selected and changeable telephone number as its caller identification identifier. It is contemplated that the dialing system 110 may be implemented through software operating locally or software which is cloud based. Alternatively, the dialing system 110 may be embodied as a hardware based electronic automatic dialer device.

The dialing system 110 may operate through a PBX system to place outgoing calls which connect to external telephones through a public switched telephone network. The dialing system 110 may be communicatively coupled with the direct inward dial database 101 so as to be able to at least read data on the direct inward dial database 101, thereby allowing it to selectively and repeatedly retrieve direct inward dial numbers which correspond to telephone numbers for use as the caller identification ("caller ID") identifier associated and transmitted with an outbound call for each outbound call that it makes.

The server computer system 120 may be defined by a single computer system or a collection of computer systems working in concert. The server computer system 120 may include computer networking components which allows it to transmit and receive data over a computer network (which may be the Internet or a personal, local, or other sized area computer network). Furthermore, the server computer system 120 may include the dialing system 110 as an integral component thereof and be communicatively coupled therewith through a bus or other wired or wireless connector or alternatively the server computer system 120 be may be communicatively coupled with the dialing system 120 over a computer network.

Each of the plurality of call receiving devices 130 may be embodied as a conventional smartphone or other mobile telephone or device which is operative connect to and receive calls wirelessly over a mobile phone network which employs cellular technology. Each of the call receiving devices may also be communicatively coupled with the server computer system 120, with the server computer system 120 having software operating thereon which allows the server computer system 120 to read data from the call receiving devices 130 related to the status of inbound calls. Such inbound call status data may include data which specifies for each inbound call (1) whether the inbound call was allowed to ring or was blocked and (2) whether the call receiving devices 130 tagged or otherwise assigned an undesirable incoming call message such as "SPAM," "SCAM," "Fraud risk" to the inbound call.

Embodiments of the system 100 for flagging and decommissioning compromised telephone numbers prior to use for outbound calling may employ at least three discrete call receiving devices 130, thereby allowing at least one of the call receiving devices 130 to operate on at least three different mobile phone networks. Significantly, by having call receiving devices 130 operating on several different networks, the system 100 can effectively determine at one time whether a given caller ID identifier is compromised on any mobile phone network, whether or not it is compromised on all of such networks.

The direct inward dial database 101 may be defined by an electronic database having stored thereon a plurality of direct inward dial numbers which define or correspond to caller ID identifiers which may be used with outbound calls. In this regard, the direct inward dial database 101 contains a plurality of caller ID identifiers which may be used by an outbound call center. The flagged number database 102 may be defined by an electronic database having stored thereon a plurality of direct inward dial numbers which define or correspond to caller ID identifiers that have been deemed by the server computer system 120 to be compromised or undesirable. The direct inward dial database 101 and flagged number database 102 may have an integral database management system.

The server computer system 120 may include either or both of the direct inward dial database 101 and the flagged number database 102 as an integral component thereof or it may be communicatively coupled therewith so as to allow the server computer system 120 to access, read and write data to the direct inward dial database 101 and the flagged number database 102.

Figure 2:
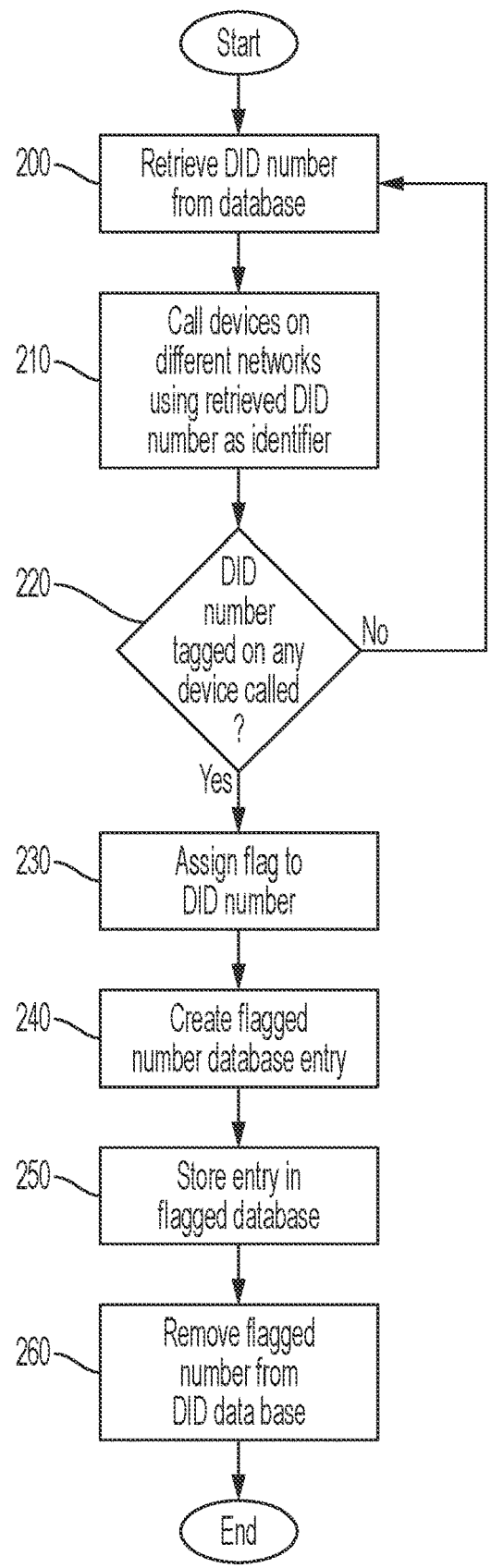
FIG. 2 show the process through which a system for flagging and decommissioning compromised telephone numbers prior to use for outbound calling handles undesirable telephone numbers in accordance with a batch method of the present invention.

Referring now to FIG. 2, the system for flagging and decommissioning compromised telephone numbers prior to use for outbound calling, when batch processing telephone numbers, begins when the dialing system retrieves from the direct inward dial database a selected direct inward dial number which defines or corresponds to a caller ID identifier which may be used with outbound calls at step 200. It is contemplated that the selected direct inward dial number which defines or corresponds to a caller ID identifier which may be used with outbound calls is an entry among the set of direct inward dial numbers which define or correspond to caller ID identifiers which may be used with outbound calls in the direct inward dial database. In this regard, the dialing system retrieves the selected direct inward dial number in order to test whether the selected direct inward dial number is compromised.

The dialing system then calls the plurality of call receiving devices using the selected direct inward dial number as the caller ID identifier at step 210. It is appreciated that since the plurality of call receiving devices include at least one call receiving device operating on several different mobile phone networks, this step allows for the selected direct inward dial number to be simultaneously presented in multiple environments, each of which may handle the selected direct inward dial number differently. Advantageously, this redundancy enables the system for flagging and decommissioning compromised telephone numbers prior to use for outbound calling to identify caller ID identifier which may be compromised in any potential environment and provide greater assurance that any caller ID identifier which is not decommissioned by the system is not undesirable anywhere in the relevant framework.

When the plurality of call receiving devices are called, each of the plurality of call receiving devices may individually determine whether to block and/or tag the incoming call due to its caller ID identifier at step 220. It is contemplated that this action may happen though the ordinary operation of the given call receiving device due to the existing call blocking and call tagging systems commonly employed by major mobile phone networks. In addition, in conjunction with the instant disclosure, each of the call receiving devices may have all onboard and/or local hardware and software-based call blocking and call tagging features turned on. This operates to ensure that each call receiving device vets the caller ID identifier to the fullest extent to which it is able.

If a call made during step 220 passes through to voicemail or is otherwise not blocked or tagged by any of the call receiving devices which was called, then no further action is needed for the selected direct inward dial number and the system may start over by retrieving a new selected direct inward dial number at step 200. On the other hand, if a call made during step 220 is blocked by any of the call receiving devices which was called, or if an undesirable tag was presented in connection with the call on any of the call receiving devices, as read by the server computer system, then the server computer system may assign flag to the direct inward dial number at step 230. This may additionally include ascertaining which call receiving device(s) blocked or tagged the inbound call, and thus the which network the relevant call receiving device(s) was operating on, as well as which action (blocking or tagging) actually occurred. In addition, if a number was tagged with an undesirable incoming call message, the specific tag assigned by the call receiving device(s) (i.e., SPAM, SCAM, Fraud risk, and so forth) may be ascertained as well.

Then, at step 240, the server computer system takes a direct inward dial number which blocked or tagged at step 220, along with any additional information ascertained at step 230, and associates this information so as to create a flagged number electronic database entry which can be stored in the flagged number database. The server computer system then stores this flagged number electronic database entry created during step 240 and stores it in the flagged number database at step 250. Finally, the server computer system accesses the direct inward dial database and removes the direct inward dial number which defines or corresponds to the caller ID identifier which was used when one or multiple of the call receiving devices blocked or tagged the outbound call made by the dialer system at step 260.

Figure 3:
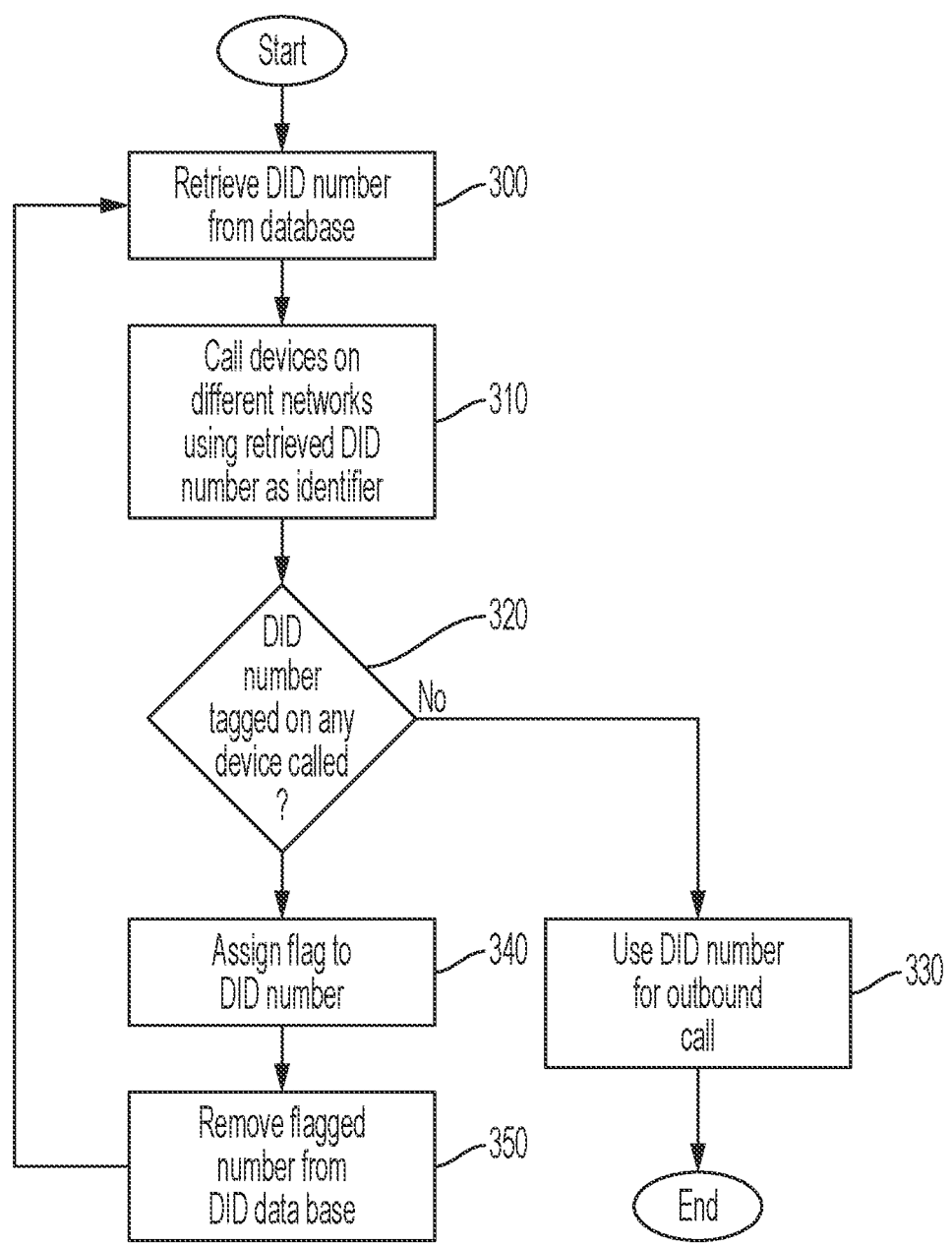
FIG. 3 shows the process through which a system for flagging and decommissioning compromised telephone numbers prior to use for outbound calling handles undesirable telephone numbers in accordance with a pre-call method the present invention.

Referring now to FIG. 3, the system for flagging and decommissioning compromised telephone numbers prior to use for outbound calling, when pre-processing telephone numbers in real time immediately or shortly before use, also begins when the dialing system retrieves from the direct inward dial database a selected direct inward dial number which defines or corresponds to a caller ID identifier which may be used with outbound calls at step 300. It is contemplated that the selected direct inward dial number which defines or corresponds to a caller ID identifier which may be used with outbound calls is an entry among the set of direct inward dial numbers which define or correspond to caller ID identifiers which may be used with outbound calls in the direct inward dial database. In this regard, the dialing system retrieves the selected direct inward dial number in order to test whether the selected direct inward dial number is compromised.

The dialing system then calls the plurality of call receiving devices using the selected direct inward dial number as the caller ID identifier at step 310. As with above, the plurality of call receiving devices include at least one call receiving device operating on several different mobile phone networks.

When the plurality of call receiving devices are called, each of the plurality of call receiving devices may individually determine whether to block or tag the incoming call due to its caller ID identifier at step 320. As previously discussed, that this action may happen though the ordinary operation of the given call receiving device due to the existing call blocking and call tagging systems commonly employed by major mobile phone networks and the active onboard and/or local hardware and software-based call blocking and call tagging features.

If a call made during step 320 passes through to voicemail or is otherwise not blocked or tagged by any of the call receiving devices which was called, this number may then be approved or passed on for immediate use in connection with the normal operations of the outbound call center at step 330. In this regard, the number may be passed to a PBX system for use for an outbound call in the nature desired by the user.

If a call made during step 320 is blocked by any of the call receiving devices which was called, or if an undesirable tag was presented in connection with the call on any of the call receiving devices, as read by the server computer system, then the server computer system may assign flag to the direct inward dial number at step 340 and then access the direct inward dial database and remove the direct inward dial number which defines or corresponds to the caller ID identifier which was used when one or multiple of the call receiving devices blocked or tagged the outbound call made by the dialer system at step 350.

It is appreciated that the server computer system may additionally and separately store data related to the blocked or tagged the outbound call as detailed in steps 230-250, detailed with reference to FIG. 2. It is appreciated that such a data store may be further useful if an outbound call center purchased a plurality of caller ID identifiers which were not supposed to be compromised and desires to seek recourse.

It is contemplated that the system for flagging and decommissioning compromised telephone numbers prior to use for outbound calling, when pre-processing telephone numbers in real time, may additionally be operative to replace a removed caller ID identifier with a similar caller ID identifier number, namely a caller ID identifier with a similar country code, area code, and/or other prefix. In such an implementation, the applicable direct inward dial number may be itself be replaced or be re-associated with another caller ID identifier number.

In an exemplary scenario, for a call center is desiring to dial customers using a database of their contact information including mobile telephone numbers, the call center may use the system for flagging and decommissioning compromised telephone numbers prior to use for outbound calling in accordance with the present disclosure to first identify which of their direct inward dial numbers which define or correspond to a caller ID identifier will result in a display of an undesirable incoming call message such as SPAM, SCAM, Fraud risk, etc. So immediately prior to dialing the customers using a given direct inward dial numbers the call center may run the system to check the direct inward dial number against the networks of AT&T, Verizon, and T-Mobile. Any direct inward dial numbers that "pass" (are able to successfully complete a call to a device on each network with no undesirable tag being applied) are cleared for use when dialing. Direct inward dial numbers that fail to pass are flagged in the call center's own database prevented from dialing. These numbers may additionally be swapped for a new direct inward dial number that is similar (such as having the same area code) and has previously been identified to not result in SPAM, SCAM, Fraud risk, etc. messages on their customers' mobile phones.

It is additionally contemplated that the system for flagging and decommissioning compromised telephone numbers prior to use for outbound calling, when batch processing telephone numbers, may be operative to run on a single database multiple on a single database, or even multiple times per day on a single database. If operating multiple times per day, the system for flagging and decommissioning compromised telephone numbers prior to use for outbound calling can provide continual updates to the database. It is further contemplated that this may even occur while outbound calls in the nature desired the user are occurring, with the system for flagging and decommissioning compromised telephone numbers prior to use for outbound calling operating in parallel to such outbound calls.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for flagging and decommissioning compromised telephone numbers prior to use for outbound calling, comprising the steps of:
    retrieving by a dialing system a target identifier for use in connection with an outbound call, wherein the dialing system is adapted to automatically initiate telephone calls which connect to external devices and the target identifier is defined by a discrete caller identification identifier;
    initiating a telephone call by the dialer system to each of a plurality of discrete call receiving devices, wherein dialer system additionally causes the target identifier to be transmitted to each of the plurality of discrete call receiving devices as a part of the telephone call being initiated; wherein a first discrete call receiving device among the plurality of discrete call receiving devices is configured to receive calls wirelessly over a first mobile phone network which employs cellular technology and a second discrete call receiving device among the plurality of discrete call receiving devices is configured to receive calls wirelessly over a second mobile phone network which employs cellular technology;
    if any of the plurality of discrete call receiving devices acting to at least one of automatically block the telephone call initiated by the dialer system due to the target identifier that was transmitted and automatically associate the telephone call initiated by the dialer system with an undesirable incoming call message due to the target identifier that was transmitted, flagging the target identifier as compromised; and
    decommissioning the flagged target identifier so as to prevent the target identifier from being retrieved again by the dialer system.

2. The method of claim 1, wherein the dialing system is adapted to initiate telephone calls which connect to external devices through a public switched telephone network.

3. The method of claim 1, additionally comprising the step of providing a set of caller identification identifiers, wherein the discrete caller identification identifier which defines the target identifier is in the set of caller identification identifiers.

4. The method of claim 3, wherein the step of decommissioning includes removing the discrete caller identification identifier which defines the target identifier from the set of caller identification identifiers.

5. The method of claim 1, wherein the step of flagging is performed by a server computer system.

6. The method of claim 5, additionally comprising the step of adding the flagged target identifier to a set of flagged identification identifiers.

7. The method of claim 6, additionally comprising the step of adding is performed by the server computer system.

8. The method of claim 1, wherein the step of decommissioning is performed by a server computer system.

9. A method for flagging and decommissioning compromised telephone numbers prior to use for outbound calling, comprising the steps of:
    providing a set of caller identification identifiers;
    retrieving by a dialing system a target identifier for use in connection with an outbound call, wherein the dialing system is adapted to automatically initiate telephone calls which connect to external devices and the target identifier is defined by a discrete caller identification identifier in the set of caller identification identifiers;

initiating a telephone call by the dialer system to each of a plurality of discrete call receiving devices, wherein dialer system additionally causes the target identifier to be transmitted to each of the plurality of discrete call receiving devices as a part of the telephone call being initiated; wherein a first discrete call receiving device among the plurality of discrete call receiving devices is configured to receive calls wirelessly over a first mobile phone network which employs cellular technology and a second discrete call receiving device among the plurality of discrete call receiving devices is configured to receive calls wirelessly over a second mobile phone network which employs cellular technology;

if any of the plurality of discrete call receiving devices acting to at least one of automatically block the telephone call initiated by the dialer system due to the target identifier that was transmitted and automatically associate the telephone call initiated by the dialer system with an undesirable incoming call message due to the target identifier that was transmitted, flagging the target identifier as compromised;

adding the flagged target identifier to a set of flagged identification identifiers; and decommissioning the flagged target identifier so as to prevent the target identifier from being retrieved again by the dialer system.

10. The method of claim 9, wherein the dialing system is adapted to initiate telephone calls which connect to external devices through a public switched telephone network.

11. The method of claim 9, wherein the step of decommissioning includes removing the discrete caller identification identifier which defines the target identifier from the set of caller identification identifiers.

12. The method of claim 9, wherein the step of flagging is performed by a server computer system.

13. The method of claim 9, wherein the step of adding is performed by a server computer system.

14. The method of claim 9, wherein the step of decommissioning is performed by a server computer system.

15. The method of claim 9, wherein the steps of flagging, adding and decommissioning are performed by a server computer system.

16. A method for flagging and decommissioning compromised telephone numbers prior to use for outbound calling, comprising the steps of:

retrieving by a dialing system a target identifier for use in connection with an outbound call, wherein the dialing system is adapted to automatically initiate telephone calls which connect to external devices through a public switched telephone network and the target identifier is defined by a discrete caller identification identifier;

initiating a telephone call by the dialer system to each of a plurality of discrete call receiving devices, wherein dialer system additionally causes the target identifier to be transmitted to each of the plurality of discrete call receiving devices as a part of the telephone call being initiated; wherein a first discrete call receiving device among the plurality of discrete call receiving devices is configured to receive calls wirelessly over a first mobile phone network which employs cellular technology and a second discrete call receiving device among the plurality of discrete call receiving devices is configured to receive calls wirelessly over a second mobile phone network which employs cellular technology;

if any of the plurality of discrete call receiving devices acting to at least one of automatically block the telephone call initiated by the dialer system due to the target identifier that was transmitted and automatically associate the telephone call initiated by the dialer system with an undesirable incoming call message due to the target identifier that was transmitted, flagging by a server computer system the target identifier as compromised; and decommissioning by the server computer system the flagged target identifier so as to prevent the target identifier from being retrieved again by the dialer system.

17. The method of claim 16, additionally comprising the step of providing a set of caller identification identifiers, wherein the discrete caller identification identifier which defines the target identifier is in the set of caller identification identifiers.

18. The method of claim 17, wherein the step of decommissioning includes removing the discrete caller identification identifier which defines the target identifier from the set of caller identification identifiers.

19. The method of claim 17, additionally comprising the step of adding the flagged target identifier to a set of flagged identification identifiers.

20. The method of claim 16, additionally comprising the step of adding the flagged target identifier to a set of flagged identification identifiers.

* * * * *